Feb. 9, 1954         F. W. DIXON         2,668,609
AUTOMOTIVE TRANSMISSION WITH REVERSE BRAKE
Filed Dec. 27, 1950         4 Sheets-Sheet 2
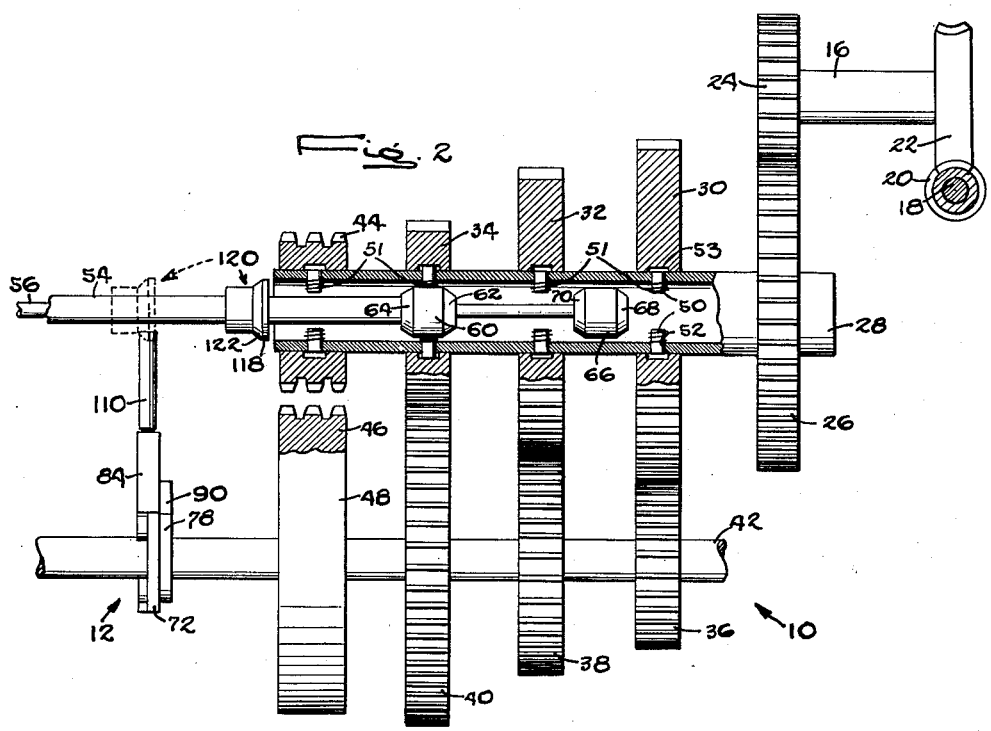
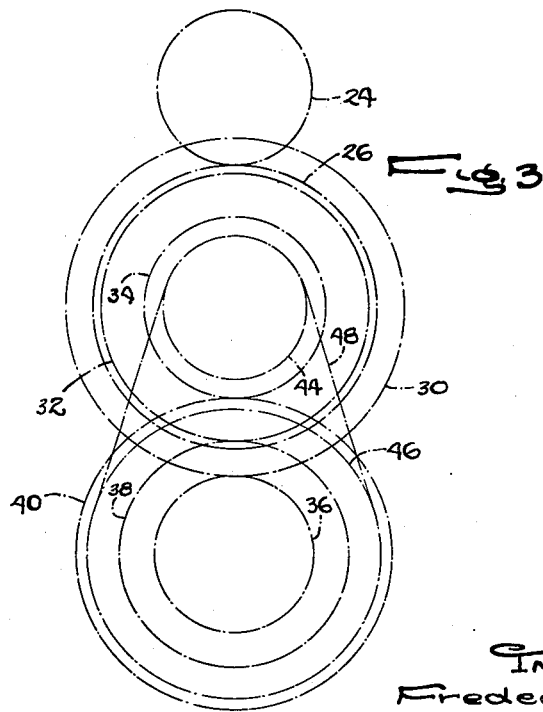
INVENTOR
Frederick William Dixon
ATTORNEY

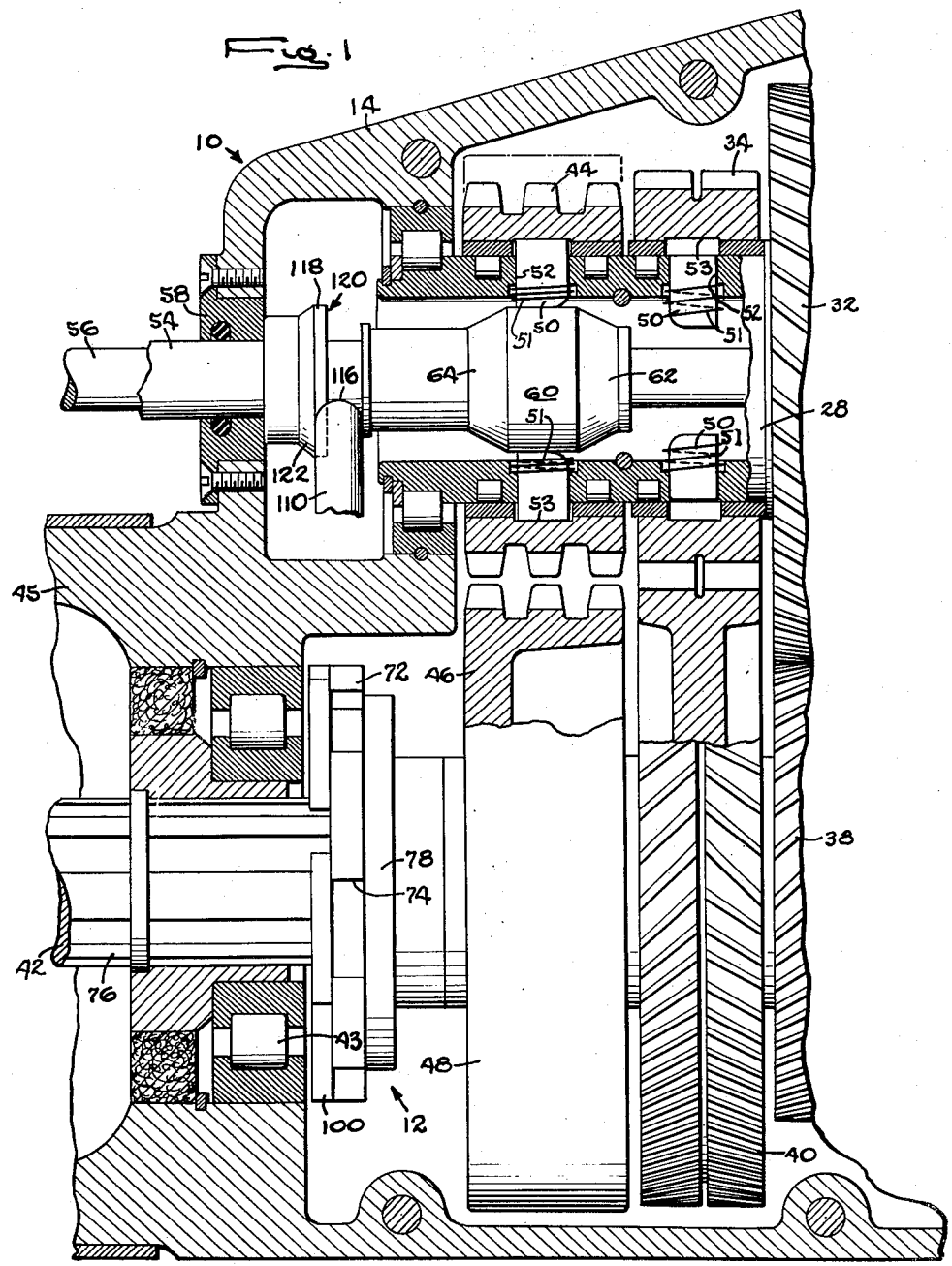

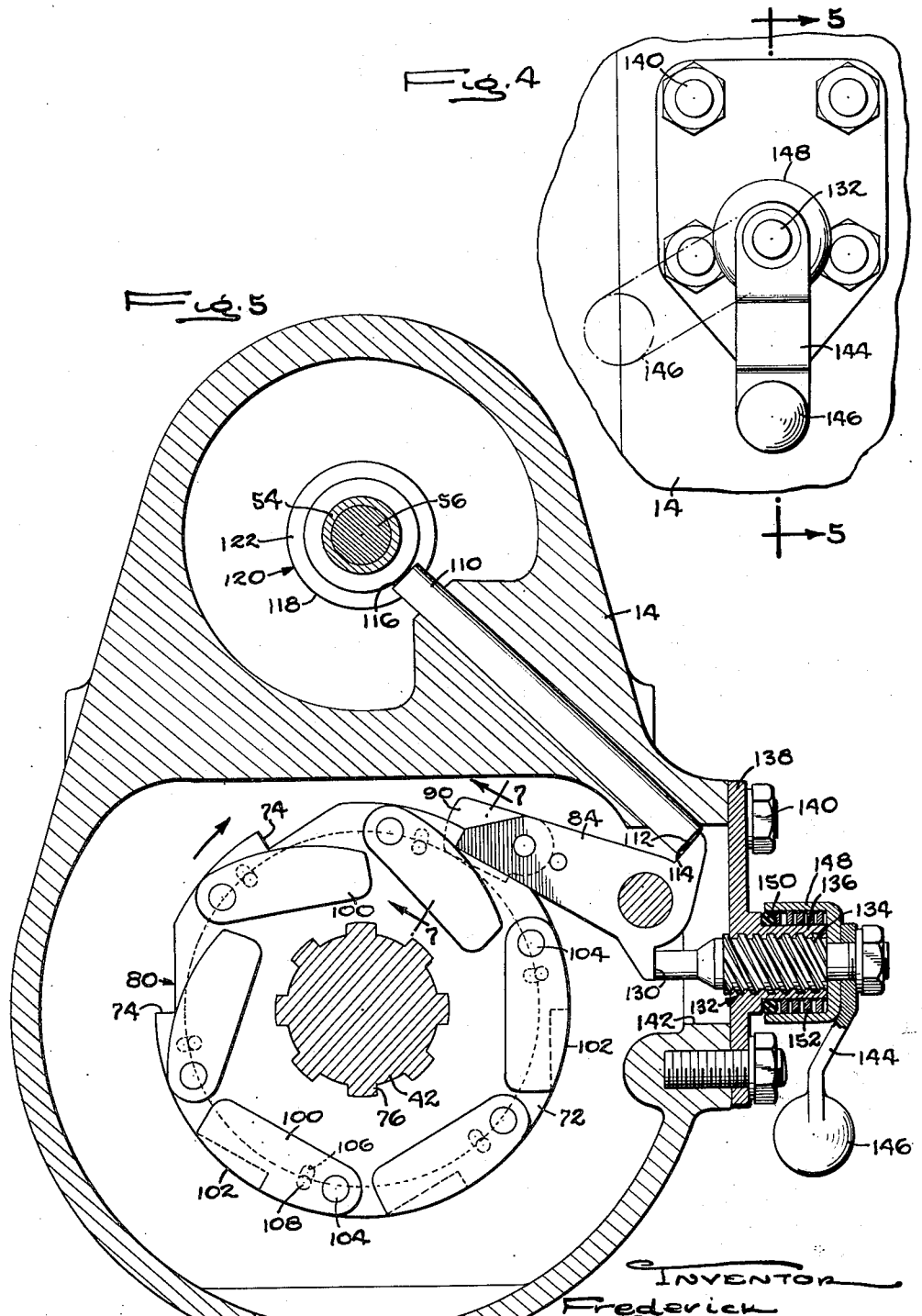

Feb. 9, 1954    F. W. DIXON    2,668,609
AUTOMOTIVE TRANSMISSION WITH REVERSE BRAKE
Filed Dec. 27, 1950    4 Sheets-Sheet 4
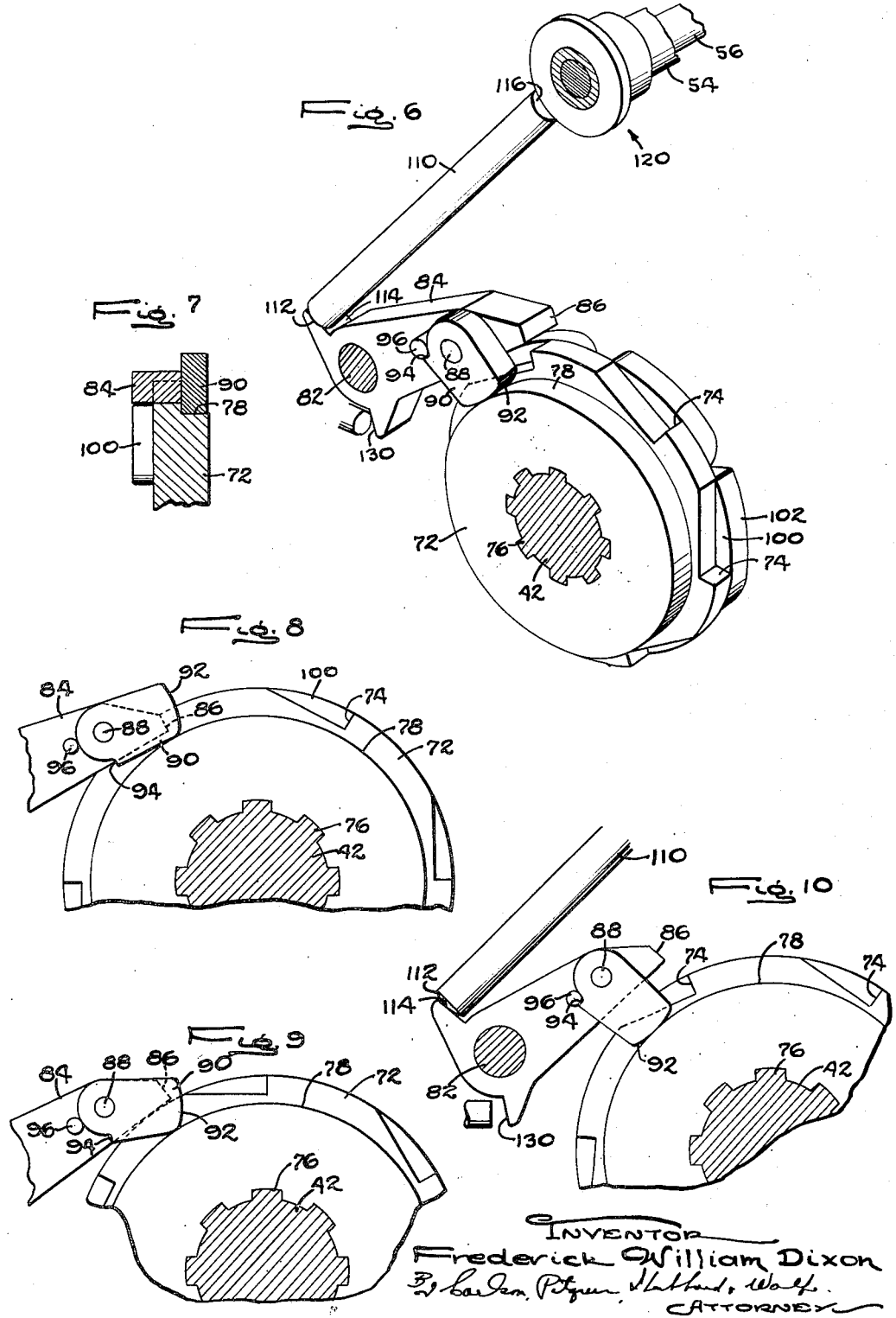

Patented Feb. 9, 1954

2,668,609

UNITED STATES PATENT OFFICE 2,668,609

AUTOMOTIVE TRANSMISSION WITH REVERSE BRAKE

Frederick William Dixon, Reigate, England, assignor to Harry Ferguson Research Limited, Abbotswood, Stow-on-the-Wold, England, a British company Application December 27, 1950, Serial No. 202,893

7 Claims. (Cl. 192—4)

The present invention relates broadly to one-way braking mechanism for preventing reverse rotation of a loaded driven shaft when the same is uncoupled from its driving shaft or other driving source.

More specifically, the invention relates to one-way engaging braking mechanisms commonly known as "hill holders" designed for used in connection with automotive transmissions and by means of which backward motion or gliding of an automotive vehicle is prevented when the vehicle is brought to rest upon an upward incline with the engine disconnected from the vehicle drive shaft, either by disengagement of the usual engine clutch, by virtue of a neutral or non-driving condition of the transmission gearing, or, where fluid drive transmissions are concerned, by reduction of the motor speed below a point where the impeller member of the fluid drive mechanism fails to hydraulically engage the turbine unit.

It is among the principal objects of the present invention to provide an automotive transmission having associated therewith a one-way braking mechanism of the character briefly outlined above and designed for use in connection with automobile transmission, which has associated therewith means for automatically and positively disabling the one-way braking mechanism when the driven shaft of the transmission is coupled to the driving shaft thereof in a reverse gear ratio.

A similar and related object is to provide a transmission having associated therewith a one-way braking mechanism of this character, together with means whereby disabling of the device becomes automatically effective immediately upon establishing a reverse gear ratio drive through the transmission, and whereby the disabling means remains effective to prevent reverse rotation of the driven shaft after the reverse gear ratio drive through the transmission has been discontinued and even after a forward gear ratio drive has been established through the transmission. Stated in other words, it is an object of the invention to provide a transmission of this sort having associated therewith means for disabling the one-way braking device when a reverse gear ratio through the transmission is established and for causing the same to remain disabled until such time as a positive forward rotation of the driven shaft is effected by the application of torque to the latter from the driving shaft. By such an arrangement a sudden locking of the transmission is prevented in instances where the vehicle is being driven in a reverse gear ratio and the application of torque to the driven shaft is discontinued, as for example by disengagement of the engine clutch while the vehicle still maintains a reverse motion, or, in the case of fluid drive transmissions, when the turbine member tends to overrun the impeller member in a reverse direction.

It is another object of the invention to provide a transmission of this character having a one-way braking device or "hill holder" associated therewith including manual means for permanently disabling the one-way braking device so that the automotive vehicle may be pushed or towed at will in either direction, as for example, when the vehicle is upon a garage floor.

A still further object of the invention is to provide a ratchet and pawl mechanism including a rotatable ratchet wheel having associated therewith a cooperating pawl together with novel means for eliminating the usual ratchet noise which ordinarily is prevalent whenever the ratchet overruns the pawl.

The provision of a transmission having a one-way braking mechanism in which the braking mechanism is extremely simple in its construction; one which is rugged and durable; one which is possessed of a relatively few number of moving parts; and one which is extremely efficient in its action and silent in its operation, are further desirable features that have been borne in mind in the production and development of the present invention.

In the accompanying two sheets of drawings forming a part of this specification, one embodiment of the invention has been shown.

In these drawings:

Figure 1 is a fragmentary sectional view, partly in elevation, taken substantially centrally and longitudinally through a transmission to which the one-way braking device of the present invention has been applied.

Fig. 2 is a schematic view of the transmission showing the one-way braking device applied thereto.

Fig. 3 is a schematic end elevational view of the transmission and one-way braking device.

Fig. 4 is a fragmentary side elevational view of the transmission casing in the vicinity of the one-way braking mechanism.

Fig. 5 is a sectional view taken substantially along the line 5—5 of Fig. 4.

Fig. 6 is a perspective view, partially schematic in its representation of a ratchet and pawl mechanism employed in connection with the present invention and showing the control mechanism therefor.

Fig. 7 is a sectional view taken substantially along the line 7—7 of Fig. 5.

Fig. 8 is a fragmentary side elevational view of a portion of the structure shown in Fig. 6.

Figs. 9 and 10 are fragmentary side elevational views similar to Fig. 8 showing the parts in different positions.

Referring now to the drawings in detail, and particularly to Figs. 1 and 2, an automotive vehicle transmission is designated in its entirety at 10 and has associated therewith a one-way braking mechanism 12 by means of which the vehicle, upon which the transmission is installed, is prevented from moving in a reverse direction, whenever the transmission 10 assumes a forward speed gear ratio or when it is in neutral condition.

The transmission illustrated herein may vary in its constructional details throughout a wide range of equivalents, but for illustrative purposes, the transmission 10 is similar to that shown and described in my co-pending application, Serial Number 33,082/49, filed in Great Britain December 28, 1949, for an Automotive Vehicle.

The transmission 10 is capable of three forward speed gear ratios and one reverse speed ratio and involves in its general organization a casing 14 in which all of the operative speed-change gear instrumentalities as well as the one-way braking mechanism 12 are enclosed.

The transmission includes a driving shaft 16 (Fig. 2) which derives its driving torque from the output shaft 18 of the vehicle engine in any suitable manner, as for example, by means of a worm 20 mounted on the engine output shaft and a worm wheel 22 secured to the shaft 16. The shaft 16 carries a gear 24 which is in constant mesh with a gear 26 fixedly mounted on a hollow tubular intermediate shaft 28 suitably journaled in the casing 14. The intermediate shaft 28 has rotatably mounted thereon a series of gears 30, 32 and 34 which latter gears are in constant mesh with a series of cooperating gears 36, 38 and 40, respectively. The gears 36, 38 and 40 are fixedly mounted on the transmission driven shaft 42 and the latter is rotatably journaled in antifriction bearings 43 within the casing 14.

The driven shaft 42 extends through a bell housing 45 and is operatively connected through suitable means, as for example, a differential mechanism (not shown) with the driving or traction wheels of the motor vehicle.

The constantly meshing gears 30 and 36 constitute the high or third speed gear ratio drive of the transmission 10. The gears 32 and 38 constitute the intermediate speed gear ratio drive, while the gears 34 and 40 constitute the low speed gear ratio drive of the transmission.

From the above description it will be seen that continuous rotation of the driving shaft 16 under the influence of the motor shaft 18 will impart continuous rotation to the intermediate shaft 28. The gears 30, 32 and 34, being loosely disposed upon the intermediate shaft 28 and being in constant mesh with the respective gears 36, 38 and 40 mounted on the driven shaft 42, are thus normally free to rotate or to be held stationary according to the tractional condition of movement or non-movement of the vehicle, as the case may be. Coupling of the gear 34 to the intermediate shaft 28 will establish a low speed gear ratio drive through the transmission, this drive existing from the motor shaft 18, worm 20, worm wheel 22, driving shaft 16, constant mesh gears 24 and 26, intermediate shaft 28, gears 34 and 40, and driven shaft 42. In a similar manner, when the gear 32 is coupled to the intermediate shaft 28, an intermediate forward speed gear ratio drive exists through the transmission leading from the driving shaft 16, constant mesh gears 24 and 26, intermediate shaft 28, and gears 32 and 38 to the driven shaft 42. Likewise, with the gear 30 connected to the intermediate shaft 28, a high speed gear ratio drive through the transmission obtains leading from the driving shaft 16, gears 24 and 26, intermediate shaft 28 and gears 30 and 36 to the driven shaft 42.

Reverse speed gear ratio through the transmission is effected by means of a sprocket wheel 44 loosely mounted on the intermediate shaft 28 and a sprocket wheel 46 fixedly secured to the driven shaft 42. A chain 48 passing over the two sprocket wheels serves to connect the same together in driving relationship and thus, when the sprocket wheel 44 is connected to the intermediate shaft 28 a drive will exist from the driving shaft 16 through gears 24 and 26, intermediate shaft 28, sprocket wheel 44, chain 48 and sprocket wheel 46 to the driven shaft 42.

The means whereby the gears 30, 32 and 34 and the sprocket wheel 44 may selectively be connected to the intermediate shaft 28 to establish third, second, first and reverse speed ratio drives through the transmission 10 has been fully illustrated and described in my above mentioned co-pending application and is schematically shown herein. This means comprises a plurality of plungers 50 which are radially slidable in radially extending passages 52 provided in the intermediate shaft 28, there being a series of six plungers for each of the gears 30, 32 and 34 and a similar series of plungers for the sprocket wheel 44. The plungers 50 are normally maintained in retracted positions by means of spring-loaded rings 51 which normally maintain the plungers in their retracted positions. The plungers are, however, capable upon application of outward radial thrust thereto of being projected radially outwardly into engagement with a series of internal recesses 53 provided in the respective gears 30, 32 and 34 and in the sprocket wheel 44.

In order to selectively project the plungers 50 outwardly from their retracted positions to selectively establish the various gear ratios of which the transmission is capable of assuming, an outer tubular selector rod 54 is slidably disposed for axial movement in a packing gland 58 at the rear of the casing 14, and an inner selector rod 56 is slidably disposed within the rod 54. The two selector rods 54 and 56 extend rearwardly of the transmission to points where they are conveniently accessible for manual operation.

The two selector rods 54 and 56 project through the wall of the transmission casing 14 and extend into the hollow tubular intermediate shaft 28 from the rear thereof. The outer selector rod 54 rotatably carries at its forward end a cam member 60 having dual cone faces 62 and 64. The inner selector shaft 56 rotatably carries at its forward end a similar cam member 66 having dual cone faces 68 and 70. The cam member 60 normally occupies a position within the tubular intermediate shaft 28 between the two series of plungers 50 associated with the gear 34 and the sprocket wheel 44 but is selectively shiftable upon movement of the tubular selector shaft 54 into engagement with either series of plungers. The cam member 66 is normally situated within the intermediate shaft 28 between the two series of plungers 50 associated with the gears 30 and 32 and is selectively shiftable upon movement of the inner selector shaft 56 into engagement with either series. Thus, when the selector shaft 54 is moved to the right, as viewed in Figs. 1 and 2, the cone surface 62 of the cam 60 engages the series of plungers 50 associated with the gear 34 and forces them outwardly into the recesses 53 provided interiorly of the gear 34, thus locking the gear 34 to the intermediate shaft 28 for rotation in unison therewith and establishing low speed gear ratio through the transmission as previously described.

When the selector rod 54 is moved to the left, as viewed in Figs. 1 and 2, the cone surface 64 will engage the series of plungers 50 associated with the sprocket wheel 44 to force the plungers outwardly and lock the sprocket wheel 44 to the intermediate shaft 28 to establish reverse speed gear ratio through the transmission in the manner previously described. In a similar manner, when the selector rod 56 is moved to the left, the series of plungers 50 associated with the gear 32 will be engaged by the cone surface 70 and the plungers will be forced outwardly into the recesses 53 of the gear 32 to lock the gear to the intermediate shaft 28 and establish intermediate speed gear ratio through the transmission. When the rod 56 is moved to the right, the cone surface 68 will engage the plungers 50 associated with the gear 30 and thus establish high speed gear ratio through the transmission.

The one-way braking mechanism 12 associated with the transmission 10 includes a ratchet wheel 72 having a series of ratchet teeth 74 formed on the periphery thereof and which is splined as at 76 to the driven shaft 42 of the transmission in the rear end region thereof. The ratchet wheel 72 is formed with an annular friction surface 78 on one side thereof, the diameter of which is slightly less than the diameter of the ratchet wheel proper so that the friction surface 78 lies wholly within the confines of the ratchet wheel and within a circular line passing through the bottoms of the notches 80 provided between adjacent ratchet teeth 74.

Suitably pivoted as at 82 to a stationary part of the transmission casing is a pawl 84 having a free end 86 designed for cooperation with the ratchet teeth 74 on the ratchet wheel 72 to prevent reverse rotation of the ratchet wheel and consequently of the driven shaft 42 in the direction indicated by the arrow in Fig. 5.

Pivoted as at 88 to one side of the pawl 84 is a pawl-disabling latch in the form of a finger 90 having a curved or rounded free end 92. The length of the latch 90 is such that the rounded end 92 thereof will oppose the friction surface 78 of the ratchet wheel 72 and, under certain conditions that will be made clear presently, engage and hold the pawl 84 in an inoperative position as shown in Fig. 10 so that the free end 86 thereof is maintained out of the path of movement of the ratchet teeth 74 when the ratchet wheel 72 is rotated in a reverse direction with the transmission in forward speed gear ratio drive, as for example, when the vehicle is coasting in a reverse direction with the transmission in a neutral condition, or when a forward gear ratio is established with the clutch mechanism of the vehicle disengaged.

A shoulder 94 provided on the latch member 90 is designed for cooperation with a pin 96 which extends laterally from the side of the pawl 84 to establish the disabling position of the latch 90.

When any of the forward speed gear ratios of which the transmission 10 is capable is established, the pawl 84 is adapted to cooperate with the ratchet teeth 74 on the ratchet wheel 72, and when the pawl 84 is thus potentially operative, the disabling latch 90 assumes the position shown in full lines in Fig. 7 so that one forward edge thereof rides on the friction surface 78. The ratchet wheel 72 may thus overrun the pawl 84 in a forward direction whenever a forward speed gear ratio exists through the transmission. In the event that the vehicle is brought to a stop on a forward and upward incline and the engine clutch is disconnected so as to free the driven shaft from the torque applying action of the driving shaft, reverse rotation of the driven shaft is prevented by virtue of the pawl 84 which will engage one of the ratchet teeth 74 and abruptly stop reverse rotation of the ratchet wheel 72 and consequently of the driven shaft 42.

In order to eliminate the usual ratchet and pawl noise or "click" which ordinarily occurs when a ratchet wheel overruns a cooperating spring or gravity pressed pawl, a plurality of shroud members or elements 100 (Fig. 5) having curved surfaces 102 are pivotally secured as at 104 to the ratchet wheel 72 adjacent the periphery thereof. Each shroud member 100 is provided with an arcuate slot 106 therein through which there extends a pin 108 which projects laterally from one side of the ratchet wheel 72 and which limits both the inward and the outward swinging movements of the shroud member 100. The shroud members 100 are centrifugally as well as gravity controlled so that when the ratchet wheel 72 is rotating with the driven shaft at a relatively high rate of speed, the shroud members 100 are swung outwardly to the limit of extent permitted by the pin and slot connection 106, 108 so that the curved or arcuate surfaces 102 thereof bridge the distance between adjacent teeth 74 on the ratchet wheel and present a smooth, continuous circular surface around the periphery of the ratchet wheel on which the end of the pawl 84 may ride. When the driven shaft 42 approaches a condition of rest, the various shroud members 100 which pass through the upper sweep of the ratchet wheel 72 will be retracted under the influence of gravity to expose the notches 80 existing between adjacent ratchet teeth so that upon reverse rotation of the driven shaft and consequently of the ratchet wheel 72, the free end 86 of the pawl may enter an adjacent notch 80 and engage a tooth 74 on the ratchet wheel and thus effectively prevent reverse rotation of the latter and consequently of the driven shaft.

In order to move the pawl 84 to its inoperative position when reverse speed gear ratio is established through the transmission 10, a throw-out plunger or thrust rod 110 is slidably mounted on the casing 14 of the transmission and has one end 112 thereof designed for cooperation with a shoulder 114 provided adjacent the pivoted end of the pawl 84. The other end 116 of the thrust rod 110 is normally in register with a cylindrical surface 118 provided on a cam member 120 having a cone surface 122 formed thereon. The cam member 120 is secured to and surrounds the outer selector rod 54 and is so positioned on the latter that when the selector rod is in a neutral position wherein the cam member 60 (Fig. 2) is situated intermediate its adjacent series of plungers 50, or when the selector rod is advanced or moved to the right so as to establish low speed gear ratio drive through the transmission as previously described, the end 116 of the thrust rod 110 is out of register with the cylindrical surface 118 of the cam member 120. However, when the selector rod 54 is moved to the left, as viewed in Fig. 2, to establish reverse speed gear ratio drive through the transmission, the end 116 of the thrust rod 110 rides outwardly on the cone portion 122 of the cam member 120 and the end 112 of the rod engages the shoulder 114 on the pawl 84 so as to throw the pawl 84 to its inoperative position. At the same time the pivoted latch member 90 swings by gravity to the position shown in Fig. 10 with the curved surface 92 thereof in opposition to the friction surface 78. Thus, upon subsequent shifting of the transmission gears to disestablish the reverse speed gear ratio drive, the weight of the pawl 84 will force the curved surface 92 of the latch 90 against the friction surface 78 and the latch will be maintained in its inoperative position during such time as reverse rotation of the driven shaft exists, even though the transmission may be shifted into a forward speed gear ratio drive. The pawl 84 will be held in this inoperative position until such time as an actual forward rotation of the driven shaft is established at which time the friction surface 78 will impart a tractional movement to the pivoted latch 90 restoring the same to the full line position thereof shown in Fig. 7, wherein an edge of the pawl rides upon the friction surface 78 during forward rotation of the driven shaft 42.

Referring now to Figs. 4 and 5, means are provided for manually disabling the pawl 84 in order that reverse motion of the vehicle may be obtained when a forward speed gear ratio obtains through the transmission 10 or when the transmission is in neutral. Toward this end, a second shoulder 130 is provided on the pawl 84 and is designed for cooperation with the forward end of a so-called "quick-thread" screw member 132 having a series of threads 134 of relatively long pitch formed thereon. The screw member 132 is threadedly received in a boss 136 provided on a cover plate 138 secured as at 140 over an opening 142 provided in the wall of the transmission casing 14. The screw member 132 projects outwardly beyond the confines of the boss 136 and carries an actuating handle 144 thereon. A weight 146 is formed on the free end of the actuating handle for the purpose of exerting a gravity influence on the threaded member 132 so as to maintain the same in such angular position that the forward end thereof is disassociated from the shoulder 130. A cap member 148 is telescopically received over the boss 136 and, in combination with the boss, confines therebetween a packing gland 150 and a coil spring 152 which bears at one end against the gland and at the other end against the cap member so as to normally urge the latter outwardly of the boss to cause a binding between the threads provided on the boss and on the member 132 which will permit the handle 144 to remain in the raised position shown in dotted lines in Fig. 4 wherein the forward end of the member 132 engages the shoulder 130 and maintains the pawl in its raised or inoperative position.

In the operation of the one-way braking device, when the transmission assumes any condition other than the condition it assumes when reverse speed gear ratio is in effect, the cam member 120 will assume the full line position shown in Fig. 2, and during rotation of the driven shaft 42 in a forward direction the pawl 84 will be urged under the influence of gravity toward its lowermost position, as shown in Fig. 8. With the driving shaft rotating at relatively high speeds, the shroud members 100 will be thrown outwardly under the influence of centrifugal force to the dotted line positions shown in Fig. 9 so that the end of the pawl 84 will ride around the periphery of the ratchet wheel 72 and ride upon the smooth, circular surface presented to it, thus maintaining the pawl substantially stationary against oscillation or chattering. As the driven shaft 42 decelerates and approaches a condition of standstill, the shroud members 100 will drop away under the influence of gravity as they pass beneath the end of the pawl 84 allowing the pawl to fall into the notches 80 existing between the adjacent teeth 74 on the ratchet wheel 72 so that in the event that reverse torque is applied to the driven shaft 42 the end of the pawl will engage the next adjacent tooth 74 on the ratchet wheel 72 and effectively block reverse rotation of the ratchet wheel and thus prevent reverse rotation of the driving shaft and consequently reverse movement of the vehicle upon which it is mounted.

The extent of elevation of the pawl 84 when the end thereof rides upon the crest of one of the teeth 74 of the ratchet wheel 72 is not sufficiently great as to permit the rounded end 92 of the latch 90 to frictionally engage the friction surface 78 when reverse rotation of the ratchet wheel 72 commences. Thus, at no time can the latch member 90 initiate a throw-out operation on the pawl 84. The pawl 84 may be moved to its inoperative position only by virtue of causing the transmission to assume its condition of reverse speed gear ratio drive or by manipulation of the handle 144.

When the selector rod 54 is moved toward the left, as viewed in Figs. 1 and 2, to cause the cone surface 64 of the cam member 60 to engage the plungers 50 associated with the sprocket wheel 44 and thus lock the wheel to the intermediate shaft 28 to establish a reverse speed ratio through the transmission, the cone surface 122 of the cam member 120 will engage the thrust rod 110 and cause the end 112 thereof to engage the shoulder 114 on the pawl 84 and elevate the latter to its inoperative position wherein the end 86 thereof is out of the path of movement of the teeth 74 provided on the ratchet wheel 72, thus disabling the pawl 84 so that reverse rotation of the ratchet wheel 72 and driven shaft 42 may take place under the driving influence of the driving shaft 16. At the same time, the latch member or finger 90 will assume its vertical position as shown in Figs. 6 and 10 with the arcuate or rounded end surface 92 thereof in opposition to the friction surface 78. The rounded end surface 92 need not necessarily engage the friction surface 78 but simply remains poised, so to speak, in position so that, should the transmission be shifted to one of its forward speed gear ratios, the rounded surface 92 will engage the friction surface 78 under the influence of the weight of the pawl 84 and force the shoulder 94 against the pin 96 so as to maintain the pawl 84 elevated until such time as the driven shaft actually moves in a forward direction. The disabling latch 90 and pin 96 are provided for the express purpose of preventing a sudden locking of the driven shaft at the instant when the shift out of reverse gear ratio is effected and when the cone surface 122 leaves the end 116 of the pin 110. It is frequently the custom of the driver of a vehicle to disengage the driving shaft from the driven shaft when the vehicle is moving in a reverse direction prior to applying the vehicle brake to bring the vehicle to a standstill. Such a maneuver on the part of the driver would be impossible without the provision of a means for disabling the pawl 84 until such time as forward movement of the vehicle had commenced.

In the event that it is desired to roll the vehicle in a reverse direction, as for example, on a garage floor, it is merely necessary to move the handle 144 from the full line position of Fig. 4 to the dotted line position thereof, thus causing the "quick-thread" screw member 132 to move inwardly and engage the shoulder 130 on the pawl 84 to elevate the latter. The spring and cap arrangement 152, 148 serves to maintain the handle 144 elevated despite the action of the weight 146 on the end of the handle 144. The weight 146, however, will serve to normally maintain the handle in its full line position, as shown in Fig. 4, and in the event that, after the handle has been employed to disable the pawl 84, the operator fails to restore the handle to its normal position, the ordinary vibrations that are attendant upon driving of the vehicle on the road will eventually restore the handle 144 to its vertical position.

I claim as my invention:

1. In an automotive transmission, an input shaft, an output shaft, a speed-change mechanism operatively connecting said shafts and selectively capable of establishing a forward drive and a reverse speed gear ratio drive through the transmission, a selector element movable from a retracted position to an advanced position for establishing said reverse speed gear ratio drive through the transmission, a one-way braking mechanism for said output shaft for preventing reverse rotation of the latter comprising a ratchet wheel fixedly mounted on said output shaft, a cooperating pawl for said ratchet wheel pivotal on a fixed axis between operative and inoperative positions, a cam member on said selector element, a thrust rod extending between said selector element and pawl and movable from a retracted position wherein one end thereof is in the path of movement of said cam member to an advanced position wherein the other end thereof engages said pawl and moves the same positively to its inoperative position, and said thrust rod being engageable by said cam member when the selector element is moved to its advanced position for moving said thrust rod to its advanced position to render said pawl inoperative.

2. A pawl and ratchet mechanism for preventing reverse rotation of a loaded driven shaft when uncoupled from its driving source comprising a ratchet wheel fixed to said driven shaft, a holding pawl movable between operative and inoperative positions, releasable means for holding said pawl in its inoperative position to permit reverse rotation of said shaft, and an element mounted on said pawl and movable when said pawl assumes its inoperative position, with the shaft rotating in a reverse direction, to a position wherein it frictionally engages a rotating part of said ratchet wheel and holds said pawl in its inoperative position, said element maintaining said position upon release of said releasable holding means until such time as a predetermined forward increment of motion is applied to said driven shaft.

3. The combination with a transmission having a driving shaft, a driven shaft and speed-change mechanism selectively operable to connect said driving shaft to said driven shaft in driving relationship to establish a forward speed drive or a reverse speed drive through the transmission or to disconnect the drive shaft from the driven shaft, of a ratchet wheel mounted on said driven shaft and rotatable therewith, a holding pawl movable from an operative position in engagement with said ratchet wheel wherein it cooperates with said ratchet wheel to prevent reverse rotation of said driven shaft to an inoperative position wherein it is out of engagement with the ratchet wheel, means operable under the control of said transmission for maintaining said pawl in its inoperative position when a reverse speed drive is established through the transmission, a latch member mounted on said pawl and movable when the latter assumes its inoperative position to a position wherein it blocks movement of the pawl toward its operative position and wherein upon disestablishment of said reverse speed drive, the latch frictionally engages a rotating part of the ratchet wheel and maintains the pawl in its inoperative position until such time as a forward increment of motion is applied to said driven shaft.

4. The combination with a transmission having a driving shaft, a driven shaft, and speed-change mechanism selectively operable to connect said driving shaft to said driven shaft in driving relationship to establish a forward speed drive or a reverse speed drive through the transmission or to disconnect the drive shaft from the driven shaft, of a ratchet wheel mounted on said driven shaft and rotatable therewith, a holding pawl movable from an operative position in engagement with said ratchet wheel wherein it cooperates with said ratchet wheel to prevent reverse rotation of said driven shaft to an inoperative position wherein it is out of engagement with the ratchet wheel, means operable under the control of said transmission for maintaining said pawl in its inoperative position when a reverse speed drive is established through the transmission, a latch member pivoted to said pawl, an annular friction surface on said ratchet wheel concentric with the axis of rotation thereof, said latch member normally resting on said friction surface in substantial tangential relationship with respect thereto when the pawl is in its operative position, and being movable when the pawl assumes its inoperative position to a position wherein an end thereof opposes said friction surface and blocks movement of the pawl to its operative position, and wherein upon disestablishment of said reverse speed drive the latch frictionally engages said friction surface and maintains said pawl in its inoperative position until such time as a forward increment of motion is applied to said driven shaft at which time the pawl is frictionally impelled to its substantially tangential position.

5. In an automotive transmission, an input shaft, an output shaft, a speed-change mechanism operatively connecting said shafts and capable of selectively establishing a forward speed gear ratio drive and a reverse speed gear ratio drive through the transmission, a selector element movable from one extreme position wherein said forward speed gear ratio drive through the transmission is established, through an intermediate position, to another extreme position wherein said reverse speed gear ratio drive is established through the transmission, a one-way braking mechanism for said output shaft for preventing reverse rotation of the latter, said one-way braking mechanism comprising a ratchet wheel fixedly secured to said driven shaft, a pawl cooperating with said ratchet wheel and movable between active and inactive positions, means operable upon movement of said selector element to its extreme position wherein reverse speed gear ratio drive is established through the transmission for moving said pawl to its inactive position, and means pivoted to said pawl and operable upon movement of the pawl to its inactive position for blocking said pawl against re-engagement with said ratchet wheel, said means being engageable with a rotating part of said ratchet wheel when the latter is rotated in a reverse direction for maintaining said means in blocking position, said means being movable due to its frictional engagement with said rotating part out of blocking position with respect to the pawl upon rotation of said ratchet wheel in a forward direction.

6. In an automatic transmission in accordance with claim 1, including means automatically operable through the action of centrifugal force during the forward drive to hold said pawl out of range of the teeth of said ratchet wheel.

7. In an automatic transmission in accordance with claim 1, including manual means selectively operable independently of said thrust rod for moving said pawl into inoperative position.

FREDERICK WILLIAM DIXON

References Cited in the file of this patent

UNITED STATES PATENTS

| Number | Name | Date |
|---|---|---|
| 1,362,783 | Cirac | Dec. 21, 1920 |
| 1,625,571 | Shinkle | Apr. 19, 1927 |
| 1,669,738 | Christianson | May 15, 1928 |
| 1,900,025 | Porter | Mar. 7, 1933 |
| 2,006,398 | Lapsley | July 2, 1935 |
| 2,037,198 | Moody | Apr. 14, 1936 |
| 2,079,106 | Cirac et al. | May 4, 1937 |